United States Patent [19]
Girovich et al.

[11] Patent Number: 5,679,262
[45] Date of Patent: Oct. 21, 1997

[54] METHOD FOR ALKALINE TREATMENT OF SEWAGE SLUDGE FOR BENEFICIAL USE

[75] Inventors: Mark Girovich, Baltimore; Donald Clark, Centerville, both of Md.

[73] Assignee: Bio Gro Systems, Inc., Annapolis, Md.

[21] Appl. No.: 387,235

[22] Filed: Feb. 13, 1995

[51] Int. Cl.⁶ .................................................... C02F 11/14
[52] U.S. Cl. ................................... 210/751; 210/764
[58] Field of Search .............................. 210/751, 609, 210/737, 764, 724–727

[56] References Cited

U.S. PATENT DOCUMENTS

| | | | |
|---|---|---|---|
| 3,941,357 | 3/1976 | Wurtz | 259/104 |
| 3,963,471 | 6/1976 | Hampton | 71/12 |
| 4,079,003 | 3/1978 | Manchak | 210/40 |
| 4,133,756 | 1/1979 | Arai et al. | 210/67 |
| 4,270,279 | 6/1981 | Roediger | 210/609 |
| 4,306,978 | 12/1981 | Wurtz | 210/750 |
| 4,509,696 | 4/1985 | Donaldson | 210/751 |
| 4,781,842 | 11/1988 | Nicholson | 210/751 |
| 4,956,926 | 9/1990 | Glorioso | 34/111 |
| 4,997,572 | 3/1991 | Wurtz | 210/751 |
| 5,069,801 | 12/1991 | Girovich | 210/770 |
| 5,135,664 | 8/1992 | Burnham | 210/751 |
| 5,186,840 | 2/1993 | Christy et al. | 210/751 |
| 5,196,043 | 3/1993 | Wurtz | 210/751 |
| 5,217,624 | 6/1993 | Yamane et al. | 210/751 |
| 5,229,011 | 7/1993 | Christy, Sr. et al. | 210/751 |
| 5,242,601 | 9/1993 | Manchak, Jr. et al. | 210/751 |
| 5,246,596 | 9/1993 | Baldwin, Jr. et al. | 210/751 |
| 5,259,977 | 11/1993 | Girovich et al. | 210/770 |
| 5,275,733 | 1/1994 | Burnham | 210/751 |
| 5,277,825 | 1/1994 | Tobler et al. | 210/751 |
| 5,277,826 | 1/1994 | Burns et al. | 210/751 |

FOREIGN PATENT DOCUMENTS 4157000  5/1992  Japan.

Primary Examiner—Thomas G. Wyse
Attorney, Agent, or Firm—Sixbey, Friedman, Leedom & Ferguson, P.C.; Donald R. Studebaker

[57] ABSTRACT

An alkaline stabilization process for treating partially dewatered sludge while reducing lime consumption, increasing nutrient values and applicability of the product, and enhancing physical handling characteristics such as dryness, granularity and spreadability including feeding a predetermined amount of partially dewatered sludge to a first mixer, adding a predetermined amount of alkaline material to the sludge in the first mixer, mixing the sludge and alkaline material together in the first mixer to form a mixture, discharging the mixture from the first mixer, directing the mixture to a second mixer, adding a predetermined amount of end product enhancing additive to the second mixer, mixing the mixture and end product enhancing additive in the second mixer to form an end product and discharging the end product from the second mixer. The system for carrying out the process includes a first mixer, a first feeder for feeding a predetermined amount of partially dewatered sludge to the first mixer, a holding bin to retain the mixture, a second feeder for feeding a predetermined amount of alkaline material to the first mixer in sufficient quantity to heat a mixture of sludge and alkaline material to a predetermined temperature and raising the pH level of the mixture to a predetermined level, a transferring device for transferring the mixture from the first mixer, a second mixer for receiving the mixture from said transferring device, a third feeder for feeding a predetermined amount of an end product enhancing additive to the second mixer and a discharge conveyor for discharging a beneficial use end product from the second mixer.

21 Claims, 1 Drawing Sheet

METHOD FOR ALKALINE TREATMENT OF SEWAGE SLUDGE FOR BENEFICIAL USE

TECHNICAL FIELD OF THE INVENTION

The present invention relates to a treatment process for converting waste water sludge into a pathogen free, uniform, durable granular product intended for beneficial use as an agricultural soil amendment or other beneficial uses. Particularly the present invention relates to a process for treating the dewatered sludge by using quicklime (calcium oxide) and end product enhancing additives in an economical manner to achieve sludge pasteurization, reduction of pathogenic organisms and vector attraction reduction to control offensive odors, to enhance the agronomic value of the end product and to produce an end product having properties desirable for beneficial use.

BACKGROUND OF THE INVENTION

The use of quicklime and similar alkaline materials for sanitation has a long history. In the last century, with the development of modern sewage systems, the use of lime products for flocculation of solids in raw sewage or liquid sludges has been developed. The role of alkaline materials in pH adjustment and the beneficial effect of pH in pathogen reduction is a more recent development, having occurred in only the last 60 years. The end result of research into pathogen reduction in wastewater treatment has prompted the U.S. Environmental Protection Agency to promulgate regulations specifying environmentally sound treatment criteria. More specifically, the EPA's standards for the use or disposal of sewage sludge (40 CFR Part 503; "Standards for the Use and Disposal of Sewage Sludge," Feb. 19, 1993) establishes methods for achieving pathogen and vector attraction reduction using alkalinity (pH) and temperature criteria.

The aforementioned EPA regulations outline a number of chemical processes allowed to treat sludge to render it suitable for beneficial use in agriculture and similar applications. The regulations establish two classes of sludge treatment products with respect to pathogen reduction: Class A and Class B. A Class A (former PFRP or Process to Further Reduce Pathogens) product can be achieved among the other methods by heating the sludge to no less than 70° C. for no less than 30 minutes (pasteurization). In order to comply with vector attraction reduction requirements the sludge pH should be raised to no less than 12 and kept at this pH level for a predetermined amount of time (pH of 12 for 2 hours followed by a pH of 11.5 for 22 hours). Adding a regulated amount of quicklime to dewatered sludge can achieve the aforementioned pH, temperature and time conditions.

A majority of research in this field involves the pathogenic stabilization of sludge through pH adjustment and heat generated from the exothermic reaction of quicklime with water. For example, U.S. Pat. No. 4,306,978 issued to Wurtz discloses a process which treats dewatered sludge cake, however, a high dose of quicklime is necessary in carrying out the process.

Quicklime (CaO) is the major expense in the alkaline (lime) treatment process. In order to meet current Class A requirements mandated by U.S. EPA (40 CFR, Part 503) significant amounts of quicklime are required.

FIG. 1 shows theoretical amounts of quicklime and lime ratios (amount of quicklime per dry ton of sludge) needed to achieve pasteurization (temperature of 70° C. for 30 minutes) for various sludges depending on their moisture content (Curve A). According to these theoretical calculations, lime ratios vary from 0.3 to 2.5 for a typical range of dewatered sludge moisture content (5%–50%). In practice, however, achieving only pasteurization is not enough to generate a marketable product suitable for the end use. Requirements such as dryness, handleability, granularity, spreadability and odor suppression are equally important to satisfy in order to beneficially make use of or dispose of the end product.

FIG. 1, Curve B experimentally obtained by the authors of the present invention graphically illustrates the amounts of quicklime and lime ratios needed to achieve sufficient dryness, granularity and spreadability of the end product in addition to pasteurization only (Curve A). Significantly, more quicklime is needed in case of Curve B.

Enhancing dryness, spreadability, granularity and the overall agronomic value of the alkaline treated sludges has been taught in a number of disclosures. Recycling, air drying, heating, addition of other alkaline materials such as cement and lime kiln dusts, fly ash, scrubber ash, seeding the end product with beneficial microflora, etc., have been proposed as ways for achieving a suitable end product.

There is clearly a need for a process which can meet the pasteurization process requirements, vector attraction reduction and the end product requirements of the Class A (pH, temperature and time standards, dryness, granularity and spreadability) while minimizing the amount of quicklime necessary in carrying out the process. Moreover, there is a need for a process which efficiently and effectively achieves a virtually pathogen free end product which is unsuitable for the regrowth of undesirable organisms. Furthermore, there is a need for a process which can enhance agronomic value and physical properties of the end product destined for a particular end use such as a fertilizer, soil amendment landfill cover or top soil substitute, and which minimizes particulate and gaseous emissions while producing a desirable end product for beneficial use.

SUMMARY OF THE INVENTION

Experiments conducted by the authors of the present invention discovered that utilizing two sequential mixing steps (two mixers) achieves the following objectives:

minimizes the consumption of quicklime;

enhances dryness and agronomic value of the end product by adding an alkaline additive containing certain materials; and improves granularity and spreadability.

It was found that in the first mixing step, a significant reduction of quicklime consumption (up to 40%) can be achieved while still meeting the pasteurization requirements (temperature no less than 70° C. for no less than 30 minutes); however, the above noted desirable physical properties (dryness, granularity, etc.) were not achieved.

A number of product enhancing additives were tested by the authors of the present invention in a second mixing step to find the best material to enhance the agronomic value of the end product and improve physical properties while minimizing the cost of the process and amount of end product produced. More specifically, a magnesium scrubber ash, a by-product of a flue gas desulfurization process was found to be particularly helpful in achieving the process objectives mentioned above for the following reasons:

1) Magnesium scrubber ash contains significant amounts of magnesium and sulfur, two major macronutrients required for plant growth. Typically, alkaline stabilized sludges contain small amounts of organic matter, nitrogen, phosphorus and potassium with no or negligible amount of magnesium and sulphur. Calcium components are predominant components of the alkaline stabilized sludges. As a result, alkaline treated sludges are limited in use. They are typically utilized as a liming agent to reduce the pH of acidic soil. When lime stabilized sludges are added to an acid soil (pH of 4–5.5) the acid neutralization reaction in the soil is:

$$Ca(OH)_2 + 2H^+(soil) = Ca^{2+}(soil) + 2H_2O.$$

If calcium carbonate ($CaCO_3$) is present in the sludge, a similar (but significantly slower) neutralization reaction takes place:

$$CaCO_3 + 2H^+(soil) = Ca^{2+}(soil) + CO_2 + H_2O.$$

In both reactions, two hydrogen ions in the soil are exchanged for one calcium ion, thus reducing the hydrogen ion soil concentration and raising the soil pH. The acid neutralizing capacity of the alkaline treated sludges is determined by acid titration to a neutral pH of seven. This is then expressed as calcium carbonate equivalence (CCE), which is the acid neutralizing capacity of the material relative to that of pure $CaCO_3$. A CCE value of 50% means that it would take two times more of the material to satisfy a soil liming requirement of pure $CaCO_3$.

Alkaline treated sludge application rates (amount of treated sludge allowed to be spread on acidic soils) are calculated based on the CCE value: the higher the CCE the less material can be land applied. If the material has a high CCE value, i.e. a high consumption of lime in alkaline stabilization process, the end product application rates are limited. This clearly adversely effects the economics of the land application of alkaline stabilized sludges. Therefore, it is beneficial to reduce the CCE value of the material being spread such that a greater amount of the end product can be disposed of by land application. In this regard, it has been found that addition of the magnesium scrubber ash reduces the CCE while increasing substantially magnesium and sulfur content of the product.

Accordingly, it is a primary object of the present invention to provide an alkaline stabilization process which overcomes the shortcomings associated with the aforementioned prior art processes by reducing lime consumption, increasing nutrient values and applicability of the product, and enhancing handling characteristics such as dryness, granularity, spreadability, etc.

It is a further object of the present invention to provide a novel process for generating a beneficial use product which is pathogen free, has no vector attraction properties, is odorless, granular and suitable for beneficial use as a soil fertilizer or liming agent.

It is another object of the present invention to utilize quicklime in a first mixing step to comply with pasteurization requirements, i.e. to achieve no less than 70° C. for no less than 30 minutes.

It is another object of the present invention to utilize a product enhancing additive(s) and preferably magnesium scrubber ash to reduce lime consumption, enhance nutrient value and agronomic applicability of the product and to improve its dryness, granularity and spreadability.

It is another object of the present invention to produce the end product with no vector attraction properties as required by pertinent regulations.

These as well as additional objects of the present invention are attained by reacting sludge and quicklime (CaO) in a first mixer to achieve pasteurization. By raising temperature and by keeping the mixture in a holding bin or similar temporary storage such as a transport vehicle for no less than 30 minutes while simultaneously raising pH to no less than 12 for two hours and pH at 11.5 for an additional 22 hours to achieve vector attraction reduction. After holding the mixture for 30 minutes, the mixture is then conveyed to a second mixer where a product enhancing additive(s) is blended to enhance the agronomic value and to improve the dryness, granularity and spreadability of the end product.

It was also found that the granularity and spreadability of the end product was improved using a second mixer after holding the mixture without adding product enhancing additives at the second mixing stage. Employing two mixing steps with addition of alternative alkaline additives significantly reduces the consumption of expensive quicklime and improves the nutrient value, and desired physical properties of the end product.

The process for treating partially dewatered sludge in accordance with the present invention includes introducing a predetermined amount of partially dewatered sludge into a mixer, adding a predetermined amount of alkaline material such as quicklime to the sludge within the mixer in a sufficient quantity to effect an exothermic reaction for heating the mixture to a predetermined temperature level and raising the pH level of the mixture. As a result, water vapor and ammonia are driven off. Ammonia can then be captured from the mixer exhaust air and sent back to the wastewater treatment plant or processed for use as a fertilizer supplement to the end product. In addition, the alkaline material reduces odor by combining with malodorous compounds rendering them inactive. The mixture is then transferred from the mixer to a holding bin or similar temporary storage by a transferring means with the mixture being retained in the mixer, transferring means and holding means for a predetermined time period so as to provide a pasteurized product which is void of pathogenic organisms. The mixture is then further transferred to a second mixer where a predetermined amount of product enhancing additive is blended with the mixture to increase dryness and granularity of the mixture and to enhance the nutrient value of the product.

The aforementioned process is carried out by an apparatus for treating partially dewatered sludge in accordance with the present invention which includes a first mixer for blending materials supplied thereto, a storage hopper with a first feed device for feeding a predetermined amount of partially dewatered sludge to the first mixer and an alkaline (quicklime) storage silo with a second feed device for feeding a predetermined amount of quicklime to the first mixer to produce a mixture having a predetermined temperature and pH. The apparatus further includes a first conveyor(s) to transfer the mixture produced in the first mixer to a holding bin or similar temporary storage where the mixture is held for a predetermined period of time.

The system further includes a second conveyor to transfer the mixture from the holding means to a second mixer at predetermined amounts. A product enhancing additive storage silo with feed device for feeding of predetermined amount of the product enhancing additive to the second mixer is also included. The end product generated in the second mixer is subsequently transferred to transportation vehicles for further marketing and distribution by a second transfer conveyor. All components of the apparatus are completely enclosed to prevent odor and dust from escaping and are forcefully ventilated to a gas scrubbing device to capture particulate matter and gaseous pollutants prior to release to the atmosphere.

These as well as other advantages of the present invention will become apparent from the following detailed description of the preferred embodiment with reference to the figures.

DETAILED DESCRIPTION OF THE PRESENT INVENTION

Figure 1:
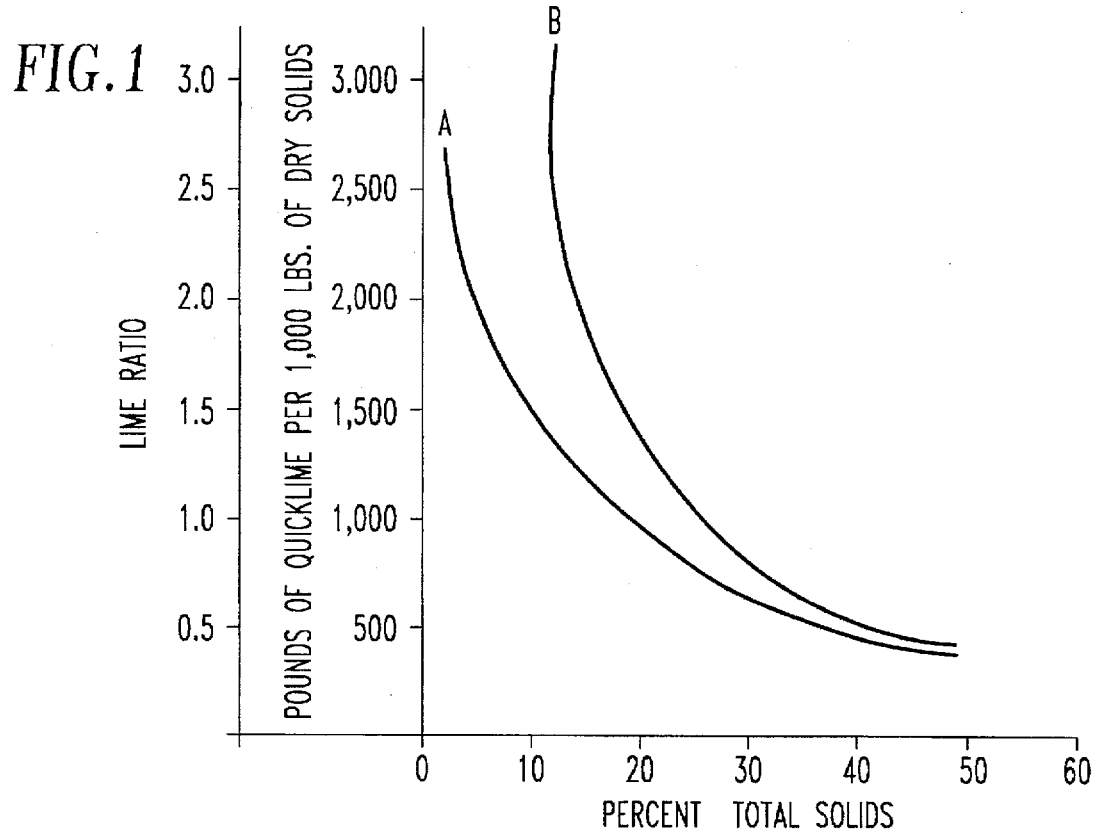
FIG. 1 is a graphical illustration of the theoretical and experimental relationships between the quicklime (CaO) consumption and dryness of the partially dewatered sludges to achieve pasteurization (temperature of no less than 70° C. for no less than 30 minutes, Curve A) and to achieve desired dryness, granularity and spreadability of the end product (Curve B).

As discussed hereinabove, FIG. 1, Curve A shows theoretical amounts of quicklime and lime ratios (amount of quicklime per dry ton of sludge) needed to achieve pasteurization (temperature of 70° C. for 30 minutes) for various sludges depending on their moisture content. According to these theoretical calculations, lime ratios vary from 0.3 to 2.5 for a typical range of dewatered sludge moisture content (5%–50%). In practice, however, achieving only pasteurization is not enough to generate a marketable product suitable for the end use. Requirements such as dryness, granularity, spreadability and odor suppression are equally important to satisfy in order to beneficially make use of or dispose of the end product. FIG. 1, Curve B experimentally obtained by the authors of the present invention shows amounts of quicklime and lime ratios needed to achieve sufficient dryness, granularity and spreadability of the end product to render it suitable for beneficial use. As illustrated, significantly more expensive quicklime is required in the case of Curve B.

Figure 2:
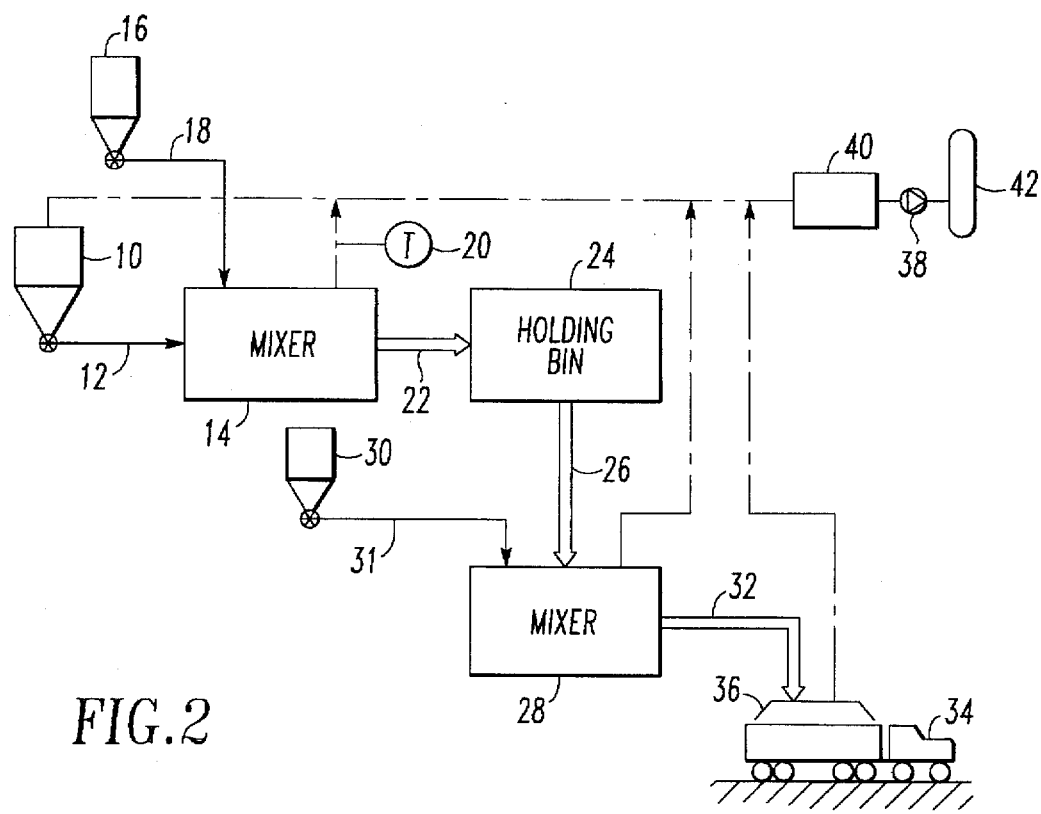
FIG. 2 is a schematic illustration of the system and process of producing a granular, pathogenically stabilized and agronomically enhanced sludge product utilizing two mixing steps with addition of quicklime in the first and a product enhancing additive(s) to the partially dewatered sludge in accordance with the present invention.

Referring now to FIG. 2, a system and process for producing a pathogenically stabilized, granular and agronomically enhanced product is illustrated. In accordance with the present invention, partially dewatered sludge is fed from a storage silo 10 by a variable speed feeding mechanism 12 into a first mixer 14 where it is to be thoroughly mixed with an alkaline material, preferably quicklime (CaO). Quicklime or other material of similar effect is simultaneously fed from a storage silo 16 by a variable speed feeding mechanism 18 to the mixer 14. While the alkaline material used in accordance with the present invention is preferable quicklime (CaO); a combination of quicklime with other alkaline materials such as fly ash, scrubber ash, kiln dusts, etc. may also be used. The rate of lime feed is controlled by a temperature sensor 20. The temperature sensor 20 measures the exhaust gas temperature and the speed of the quicklime feeding mechanism 18 is adjusted to maintain a predetermined temperature required to meet pasteurization standards (temperature of the product to be no less than 70° C. for 30 minutes).

As noted hereinabove, the rate of quicklime feed depends upon the moisture content of the dewatered sludge, i.e. the wetter the sludge, the greater the moisture content, the more quicklime is required to maintain the requisite pasteurization temperature. Simultaneously, with the raising of the temperature, the pH of the mixture must also be raised to no less than 12.

In addition to raising temperature and pH, quicklime also affects the odor of the mixture. Many strong odor compounds, especially sulfur containing ones such as hydrogen sulfide and organic sulfides are greatly suppressed with the addition of quicklime. On the other hand, as the pH level raises above 9, gaseous ammonia is forced out of the mixture. In the present invention, it is preferred that the dewatered sludge be 10% to 60% solids by weight and the amount of quicklime be 20% to 250% of that of the partially dewatered sludge on a dry weight basis.

From the first mixer 14 by a transferring conveyor(s) 22, the mixture is transported to a holding bin 24 where it is kept for no less than 30 minutes to satisfy the requisite pathogen reduction requirements. From the holding bin 24, by a transferring conveyor(s) 26, the mixture is then transported to a second mixer 28. A product enhancing additive(s) is introduced from a product enhancing storage silo 30 into the mixer 28 by a variable speed feeding mechanism 31. Product enhancing additives can be selected from a group of materials such as scrubber ash, kiln dust, fly ash, etc. In the present invention, it is preferred that the product enhancing additive be a magnesium scrubber ash as described in the previous sections and the amount of the magnesium scrubber ash be 10% to 150% of that of the partially dewatered sludge on a dry weight basis. The feed rate of the magnesium scrubber ash is to be controlled by dryness of the end product or by the amount of enhancing macronutrients such as magnesium and sulfur desired in the end product destined for agricultural application.

From the second mixer 28, the end product is transported by transferring conveyor(s) 32 to transport vehicles 34 for further marketing and distribution. The components of the apparatus such as mixers 14 and 28, transferring conveyors 12, 22, 26, 31 and 32, storage silo 10, holding bin 24 and the transport vehicle enclosure 36 are totally enclosed and forcefully ventilated by an exhaust fan 38 which draws the exhaust to a wet scrubber 40 for treatment prior to the release into the atmosphere via stack 42.

By processing partially dewatered sludge in the manner described hereinabove, the requisite temperature, time and pH levels are obtainable while producing an agronomic end product with a reduction in quicklime consumption. By utilizing two separate mixing stations, the alkalinity level and temperature level of the mixture can be readily controlled without concern for the final moisture content of the material emanating from the first mixer. With prior art systems, one must also be concerned with the solids content of the mixture exiting the mixer which often requires the addition of greater amounts of quicklime than are necessary to achieve the required temperature and pH. Thus, expensive materials were being wasted, when, as is evidenced by the foregoing description, a less expensive additive which enhances the dryness and nutrient value of the final product can be used. Further, by adding the less expensive additive in a separate mixing stage, the amount of additive can be readily controlled to produce an end product exhibiting optimum handling characteristics.

While the present invention is being described with reference to a preferred embodiment as well as alternative embodiments, it will be appreciated by those skilled in the art that the invention may be practiced otherwise then as specifically described herein without departing from the spirit and scope of the invention. It is, therefore, to be understood that the spirit and scope of the invention be limited only by the appended claims.

We claim:

1. A process for treating partially dewatered sludge comprising:

feeding a predetermined amount of partially dewatered sludge to a first mixer;

adding a predetermined amount of alkaline material to the sludge in the first mixer;

mixing the sludge and alkaline material together in the first mixer to form a mixture, said alkaline material being added in sufficient quantity to effect an exothermic reaction for heating the mixture to a temperature level of at least 70° C. for at least 30 minutes and raising the pH level of the mixture;

discharging said mixture from the first mixer; then directing the mixture from the first mixer to a second mixer;

changing a composition of the mixture in said second mixer by adding a predetermined amount of an end product enhancing additive for enhancing an agronomic value of the end product to the second mixer;

mixing the mixture and end product enhancing additive in the second mixer to form a granular agronomically enhanced end product; and discharging the end product from the second mixer.

2. The process as defined in claim 1, wherein said alkaline material is chosen from a group consisting of quicklime, lime kiln dust, cement kiln dust, lime, calcium hydroxide, fly ash and other alkaline materials.

3. The process as defined in claim 1, wherein the predetermined alkalinity level of the product is no less than 12 and is maintained for no less than 2 hours in order to destroy pathogens and to reduce vector attraction of the end product.

4. The process as defined in claim 1, wherein the predetermined temperature is no less than 70° C. (158° F.) and is maintained for no less than 30 minutes for in order to destroy pathogens and to reduce vector attraction of the end product.

5. The process as defined in claim 1, further comprising the step of enclosing said first and second mixers in a housing and ventilating said housing.

6. The process as defined in claim 5, wherein the step of ventilating includes drawing off exhaust generated by said mixture.

7. The process as defined in claim 1, wherein said predetermined amount of alkaline material is 20% to 250% of the predetermined amount of sludge fed to said first mixer on a dry weight basis.

8. The process as defined in claim 1, wherein said end product enhancing additive is chosen from a group consisting of scrubber ash, kiln dust and fly ash.

9. The process as defined in claim 8, wherein said end product enhancing additive is magnesium scrubber ash.

10. The process as defined in claim 8, wherein said predetermined amount of end product enhancing additive is 10% to 150% of the mixture on a dry weight basis.

11. The process as defined in claim 1, further comprising the step of transferring the mixture from the first mixer to a holding bin and holding the mixture in the holding bin for a predetermined time period before directing the mixture to the second mixer.

12. A process for treating partially dewatered sludge, said process comprising the steps of:

feeding a predetermined amount of partially dewatered sludge to a first mixer;

adding a predetermined amount of alkaline material to the sludge in the first mixer in sufficient quantity to effect an exothermic reaction for heating the mixture to a temperature of at least 70° C. for no less than 30 minutes and raising the pH level of the mixture to a predetermined level;

transferring the mixture from said first mixer to a holding bin and retaining the mixture for a period of time of at least 30 minutes so as to provide a mixture void of pathogenic organisms; then transferring the mixture from the holding bin to a second mixer;

changing a composition of the mixture in said second mixer by adding a predetermined amount of an end product enhancing additive for enhancing an agronomic valve of the end product to the second mixer to reduce alkaline material consumption, increase the dryness and better control odor and emissions;

mixing the mixture and end product enhancing additive in the second mixer to form a granular agronomically enhanced end product; and discharging the end product from the second mixer.

13. The process as defined in claim 12, wherein said alkaline material is chosen from a group consisting of quicklime, lime kiln dust, cement kiln dust, lime, calcium hydroxide, fly ash and other alkaline materials.

14. The process as defined in claim 12, wherein the predetermined alkalinity level of the product is no less than 12 and is maintained for no less than 2 hours in order to destroy pathogens and to reduce vector attraction of the end product.

15. The process as defined in claim 12, wherein the predetermined temperature is no less than 70° C. (158° F.) and is maintained for no less than 30 minutes for in order to destroy pathogens and to reduce vector attraction of the end product.

16. The process as defined in claim 12, further comprising the step of enclosing said first mixer, said holding bin and second mixer in a housing and ventilating said housing.

17. The process as defined in claim 16, wherein the step of ventilating includes drawing off exhausted generated by said mixture.

18. The process as defined in claim 12, wherein said predetermined amount of alkaline material is 20% to 250% of the predetermined amount of sludge fed to said first mixer on a dry weight basis.

19. The process as defined in claim 12, wherein said end product enhancing additive is chosen from a group consisting of scrubber ash, kiln dust and fly ash.

20. The process as defined in claim 19, wherein said end product enhancing additive is magnesium scrubber ash.

21. The process as defined in claim 19, wherein said predetermined amount of end product enhancing additive is 10% to 150% of the mixture on a dry weight basis.

* * * * *